US011977695B2

(12) United States Patent
Li et al.

(10) Patent No.: US 11,977,695 B2
(45) Date of Patent: May 7, 2024

(54) TOUCH MODULE AND TOUCH DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zewen Li, Beijing (CN); Xiaofeng Luo, Beijing (CN); Kwanggyun Jang, Beijing (CN); Hongqiang Luo, Beijing (CN); Guiyu Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/760,346

(22) PCT Filed: Oct. 22, 2021

(86) PCT No.: PCT/CN2021/125617
§ 371 (c)(1),
(2) Date: Aug. 8, 2022

(87) PCT Pub. No.: WO2022/134817
PCT Pub. Date: Jun. 30, 2022

(65) Prior Publication Data
US 2023/0066243 A1 Mar. 2, 2023

(30) Foreign Application Priority Data
Dec. 25, 2020 (CN) .......................... 202011558344.6

(51) Int. Cl.
*G06F 3/041* (2006.01)

(52) U.S. Cl.
CPC .................................. *G06F 3/041* (2013.01)

(58) Field of Classification Search
CPC ...... G06F 3/041; G06F 3/0445; G06F 3/0412; G06F 3/0446; G06F 2203/04103;
(Continued)

(56) References Cited

U.S. PATENT DOCUMENTS 10,534,483 B2 * 1/2020 Lee ..................... G06F 3/03545
2015/0145847 A1 5/2015 Kim et al.
(Continued)

FOREIGN PATENT DOCUMENTS

CN 103338582 A 10/2013
CN 107154218 A 9/2017
(Continued)

OTHER PUBLICATIONS

International Search Report received for PCT Patent Application No. PCT/CN2021/125617, dated Dec. 23, 2021, 7 pages (3 pages of English Translation and 4 pages of Original Document).
(Continued)

*Primary Examiner* — Sahlu Okebato
(74) *Attorney, Agent, or Firm* — WOMBLE BOND DICKINSON (US) LLP

(57) ABSTRACT

A touch module and a touch display device are provided. The touch module includes: a substrate, including a touch region and a non-touch region around the touch region, the non-touch region including a wiring region, a non-bonding region and a bonding region; a touch structure, located in the touch region; at least one pad, located in the non-touch region, the at least one pad including a pad bonding portion in the bonding region and a pad non-bonding portion in the non-bonding portion; at least one wiring, located in the wiring region and electrically connected to the touch structure; and at least one first dummy pattern; wherein the at
(Continued)

least one wiring is further electrically connected to the at least one pad, the at least one first dummy pattern is located in the non-bonding region and adjacent to the at least one pad.

20 Claims, 7 Drawing Sheets

(58) Field of Classification Search
CPC ...... G06F 3/04164; G06F 2203/04102; H10K 59/00; H10K 59/12; H10K 59/40
See application file for complete search history.

(56) References Cited

U.S. PATENT DOCUMENTS

| | | | |
|---|---|---|---|
| 2015/0301372 | A1 | 10/2015 | Mori |
| 2018/0039364 | A1 | 2/2018 | Pan et al. |
| 2018/0196298 | A1 | 7/2018 | Ueno et al. |
| 2019/0059156 | A1 | 2/2019 | Kwon et al. |
| 2020/0167054 | A1* | 5/2020 | You .................... H10K 50/8426 |
| 2020/0210041 | A1* | 7/2020 | Liu .................... G06F 3/04164 |
| 2021/0286465 | A1* | 9/2021 | Jung .................... G06F 3/04164 |
| 2021/0358959 | A1 | 11/2021 | Jiang et al. |

FOREIGN PATENT DOCUMENTS

| | | |
|---|---|---|
| CN | 108139641 A | 6/2018 |
| CN | 207458009 U | 6/2018 |
| CN | 109188790 A | 1/2019 |
| CN | 109254696 A | 1/2019 |
| CN | 109407425 A | 3/2019 |
| CN | 109445649 A | 3/2019 |
| CN | 110346994 A | 10/2019 |
| CN | 113377246 A | 9/2021 |
| CN | 215181920 U | 12/2021 |

OTHER PUBLICATIONS

Office Action received for Chinese Patent Application No. 202023174012.6, dated Jul. 15, 2021, 3 pages (2 pages of English Translation and 1 page of Original Document).
Office Action received for Chinese Patent Application No. 202023174012.6, dated May 31, 2021, 6 pages (4 pages of English Translation and 2 pages of Original Document).

* cited by examiner

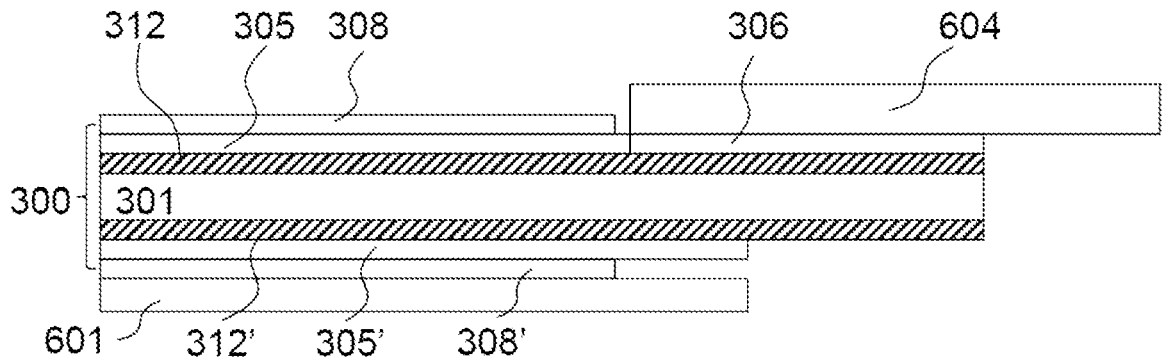

FIG. 6

| providing a substrate, the substrate comprising a touch region and a non-touch region around the touch region, the non-touch region comprising a wiring region, a non-bonding region and a bonding region; a touch structure located in the touch region; at least one pad located in the non-touch region, the at least one pad comprising a pad bonding portion in the bonding region and a pad non-bonding portion in the non-bonding region | S701 |

↓

| arranging at least one wiring in the wiring region, one end of the at least one wiring being electrically connected to the touch structure, and the other end of the at least one wiring being electrically connected to the pad | S702 |

↓

| arranging at least one first dummy pattern in the non-bonding region, the first dummy pattern being adjacent to the at least one pad | S703 |

FIG. 7

| At% | before HAST | after HAST, OK sample | after HAST, control sample |
|---|---|---|---|
| C | 26.81 | 40.31 | 51.02 |
| O | 13.68 | 14.91 | 21.68 |
| Cu | 57.84 | 43.34 | 24.25 |

TOUCH MODULE AND TOUCH DISPLAY DEVICE

RELATED APPLICATIONS

The present application is a 35 U.S.C. 371 national stage application of PCT International Application No. PCT/CN2021/125617, filed on Oct. 22, 2021, which claims the benefit of Chinese Patent Application under the application number 202011558344.6 filed on Dec. 25, 2020, the entire disclosure of which is incorporated herein by reference.

FIELD

The present disclosure relates to the field of display technologies, especially to a touch module and a touch display device.

BACKGROUND

At present, flexible AMOLED screens have become a standard configuration for mid-to-high-end mobile phones. More and more stringent requirements are imposed on the environmental reliability of flexible screens, and flexible AMOLED screens are usually required to be subjected to a highly accelerated temperature and humidity stress test (HAST: 110° C., 85% RH, 0.122 MPa, 32 h). High temperature and high humidity environments require that sensor wirings are better protected from water and oxygen corrosion.

SUMMARY

The present disclosure provides a touch module and a touch display device. Water vapor is prevented by dummy patterns from corroding wirings in a non-touch region, so as to ensure that the wirings are not corroded and disconnected.

According to an aspect of the present disclosure, there is provided a touch module. The touch module comprises: a substrate, comprising a touch region and a non-touch region around the touch region, the non-touch region comprising a wiring region, a non-bonding region and a bonding region; a touch structure, located in the touch region; at least one pad, located in the non-touch region, the at least one pad comprising a pad bonding portion in the bonding region and a pad non-bonding portion in the non-bonding region; at least one wiring, located in the wiring region and electrically connected to the touch structure; and at least one first dummy pattern; wherein the at least one wiring is further electrically connected to the at least one pad, the at least one first dummy pattern is located in the non-bonding region and adjacent to the at least one pad.

Optionally, in some embodiments, the at least one wiring is distributed on a side of the at least one first dummy pattern close to the touch region.

Optionally, in some embodiments, the at least one first dummy pattern is located at an end of the non-bonding region close to the touch region. Optionally, in some embodiments, a length extension direction of the at least one first dummy pattern is substantially parallel to a length extension direction of the at least one pad.

Optionally, in some embodiments, a minimum distance between the at least one first dummy pattern and a directly adjacent pad is greater than or equal to twice a maximum width of a wiring.

Optionally, in some embodiments, a minimum distance between the at least one first dummy pattern and a directly adjacent wiring is greater than or equal to twice a maximum width of a wiring.

Optionally, in some embodiments, a minimum length of the at least one first dummy pattern is greater than or equal to a maximum width of the directly adjacent pad.

Optionally, in some embodiments, a material of the at least one first dummy pattern is at least one of a conductive metal, a metal oxide, and a metal alloy material.

Optionally, in some embodiments, the at least one wiring, the at least one pad, and the at least one first dummy pattern comprise the same material.

Optionally, in some embodiments, an end of the at least one first dummy pattern close to the wiring is substantially flush with an end of at least one adjacent pad close to the wiring.

Optionally, in some embodiments, a maximum distance and a minimum distance between an end of the at least one first dummy pattern away from the wiring and the bonding region range from about 0.05 mm to 0.15 mm.

Optionally, in some embodiments, the non-touch region comprises at least one pad group consisting of the at least one pad.

Optionally, in some embodiments, the at least one pad group comprises at least one sensing electrode pad group and at least one transmitting electrode pad group.

Optionally, in some embodiments, the at least one first dummy pattern and/or the at least one wiring have a double-layer structure.

Optionally, in some embodiments, the double-layer structure comprises an ITO layer and a metal layer having an area at least partially overlapping the ITO layer.

According to another aspect of the present disclosure, there is provided a touch module. The touch module comprises: a substrate, comprising a touch region and a non-touch region around the touch region, the non-touch region comprising a side region; a touch structure, located in the touch region; at least one wiring; at least one lap block; and at least one second dummy pattern; wherein a portion of the at least one wiring, the at least one lap block, and the at least one second dummy pattern are located in the side region; the at least one wiring is electrically connected to the at least one lap block, the at least one lap block is electrically connected to the touch structure, and the at least one second dummy pattern is adjacent to the at least one lap block.

Optionally, in some embodiments, the at least one lap block comprises a plurality of lap blocks that are arranged along a first direction, and the at least one second dummy pattern is located in a gap between adjacent lap blocks.

Optionally, in some embodiments, the at least one wiring comprises a plurality of wiring, and the plurality of wirings are distributed on a side of the at least one second dummy pattern away from the touch region.

Optionally, in some embodiments, the at least one second dummy pattern and the plurality of lap blocks are arranged in the first direction, and the at least one second dummy pattern and the plurality of lap blocks have substantially the same width in a second direction, the first direction intersecting the second direction.

Optionally, in some embodiments, the touch structure comprises a plurality of touch signal lines; the plurality of touch signal lines comprise a plurality of first touch signal lines arranged along the first direction and a plurality of second touch signal lines arranged along the second direction, the plurality of first touch signal lines and the plurality of lap blocks are in one-to-one correspondence, and an end of the lap block close to the touch region is connected to a corresponding first touch signal line.

Optionally, in some embodiments, the first touch signal line comprises a sensing electrode.

Optionally, in some embodiments, a minimum distance between the at least one second dummy pattern and a directly adjacent lap block is greater than or equal to twice a maximum width of the wiring.

Optionally, in some embodiments, a length extension direction of the at least one second dummy pattern is substantially parallel to an extension direction of the plurality of wirings in the side region; a minimum distance between the at least one second dummy pattern and the directly adjacent wiring is greater than or equal to twice the maximum width of the wiring.

Optionally, in some embodiments, a material of the at least one second dummy pattern is at least one of a conductive metal, a metal oxide, and a metal alloy material.

Optionally, in some embodiments, the at least one wiring, the at least one lap block, and the at least one second dummy pattern comprise the same material.

Optionally, in some embodiments, the at least one second dummy pattern and/or the at least one wiring have a double-layer structure.

Optionally, in some embodiments, the double-layer structure comprises an ITO layer and a metal layer having an area at least partially overlapping the ITO layer.

Optionally, in some embodiments, the first touch signal line and the lap block at least have partially overlapping areas.

Optionally, in some embodiments, the first touch signal line and the lap block have different materials and are located in different film layers.

According to a further aspect of the present disclosure, there is provided a touch display device. The touch display device comprises: a display panel, and the touch module according to any one of the foregoing embodiments arranged on the display panel.

Optionally, in some embodiments, a material of a wiring of the touch module comprises copper; and an atomic percentage of copper of the wiring is greater than or equal to 40%.

BRIEF DESCRIPTION OF THE DRAWINGS

In order to more clearly illustrate embodiments of the present disclosure or technical solutions in the prior art, the drawings to be used for description of the embodiments or the prior art will be briefly introduced below. Obviously, the drawings described below are only some embodiments of the present disclosure. A person having an ordinary skill in the art may also obtain other drawings based on these drawings without spending inventive efforts.

FIG. 6 shows a schematic cross-sectional view of a touch display device according to an embodiment of the present disclosure;

FIG. 7 shows a flowchart of a manufacturing method of a touch module according to an embodiment of the present disclosure;

DETAILED DESCRIPTION

The technical solutions in embodiments of the present disclosure will be described clearly and comprehensively below in conjunction with the drawings in the embodiments of the present disclosure. Obviously, the described embodiments are only part of the embodiments of the present disclosure, rather than all of them. All other embodiments obtained by a person having an ordinary skill in the art based on the embodiments of the present disclosure without spending inventive efforts fall within the protection scope of the present disclosure.

The present application provides a technical solution for improving the reliability of wirings in a touch module. By adding a dummy pattern in a pad and/or side region, water and oxygen can be prevented from invading the wirings, which can solve the problem of corrosion and disconnection of the wirings caused by a highly accelerated temperature and humidity stress test (HAST).

Figure 1:
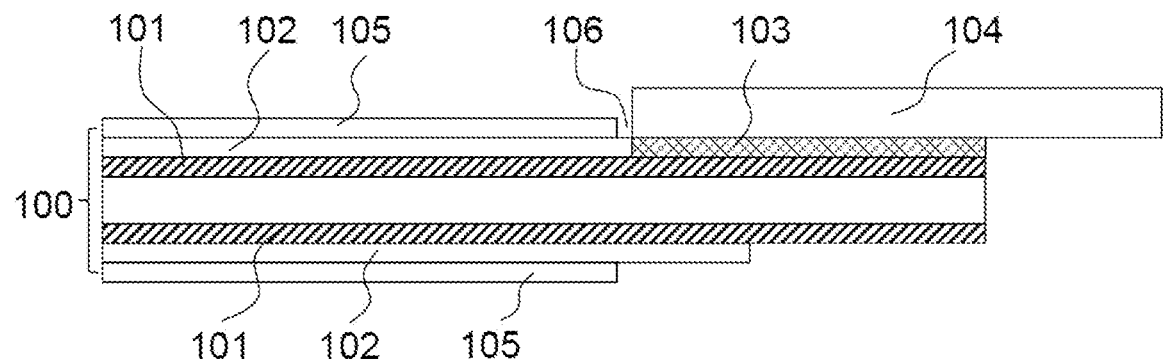
FIG. 1 illustrates a laminated structure of a touch display panel in the related art.

FIG. 1 illustrates a laminated structure 100 of a touch display panel in the related art. In an edge region of a touch module, a touch electrode 101 is usually electrically connected to a wiring 102, and an end of the wiring 102 is arranged with a pad 103 for connection with external circuits such as a touch flexible printed circuit 104. The wiring 102 is typically made of metal (e.g., copper). In the manufacturing process of a touch module, an insulating layer 105 is generally covered on the wiring 102. The insulating layer 105 is usually fabricated by a sheet-to-sheet process or a roll-to-roll process. In the sheet-to-sheet process, an insulating layer is generally made using a coating process. In the roll-to-roll process, an insulating layer is generally made using a dry film pressing process.

Figure 2:
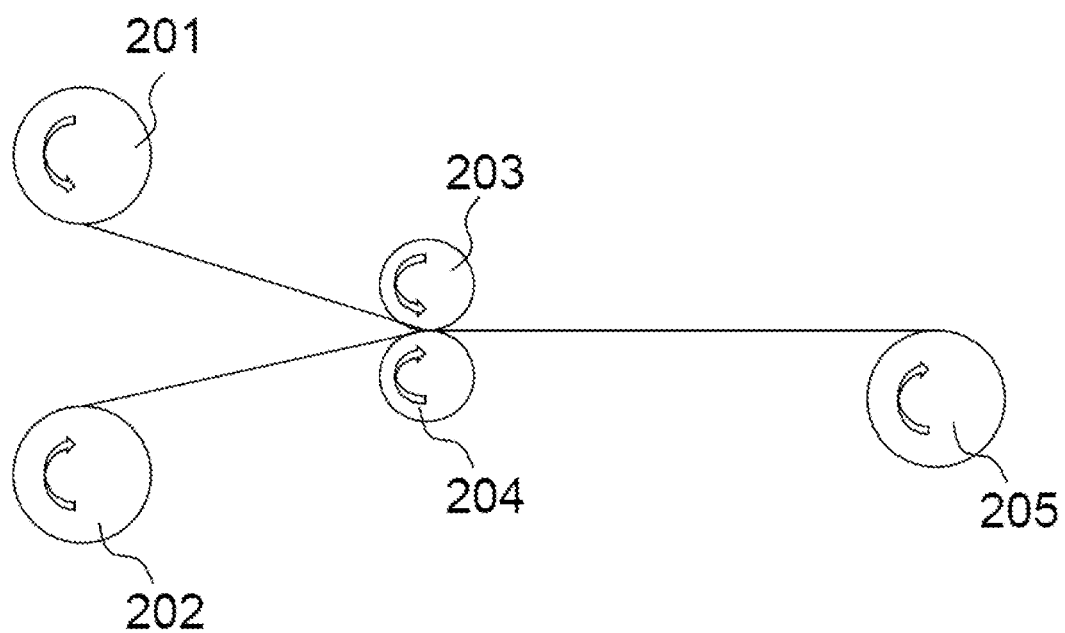
FIG. 2 illustrates a process for fabricating an insulating layer using a dry film pressing process in the related art.

FIG. 2 illustrates a process for fabricating an insulating layer using a dry film pressing process in the related art. A release roller 201 releases a film material carrying a touch electrode and a wiring, a release roller 202 releases a film material of an insulating layer, and a pressure roller 203 and a pressure roller 204 apply temperature and pressure to the two film materials to realize a combination of the two film layers. The dry film pressing process may also generally involve a take-up roller 205 for collecting the film materials carrying the touch electrode, the wiring and the insulating layer.

The roll-to-roll process has high production efficiency and low cost. However, making the insulating layer using the dry film pressing process requires proper adjustment of process parameters such as temperature and pressure. Otherwise, the adhesive force of the insulating layer will decrease and the insulation and waterproof effects thereof cannot be achieved.

The inventors found that in an extreme environment of the highly accelerated temperature and humidity stress test, wirings have an increased risk of being corroded by water vapor due to the following factors. The adhesive force of the insulating layer made by the dry film pressing process may decrease, which will result in poor insulation and sealing effects at edges of the touch module. In a high temperature and high humidity environment, materials expand and contract seriously, and different materials have inconsistent expansions and contractions, resulting in poor adhesion of the insulating layer. In the highly accelerated temperature and humidity stress test, each layer of the module has a different degree of water absorption. Considering the bonding tolerance and material expansion and contraction, the risk of wiring exposure is increased (e.g., at a gap 106 shown in FIG. 1) at the position where a pad is connected to an external circuit. The current flexible screens mostly employ the design of ultra-narrow frames, and the wirings are thinner and thinner (the line width is about 5 µm). Therefore, there is an increasing risk of wiring disconnection caused by corrosion at the pad positions and the side positions of the touch module.

Figure 3:
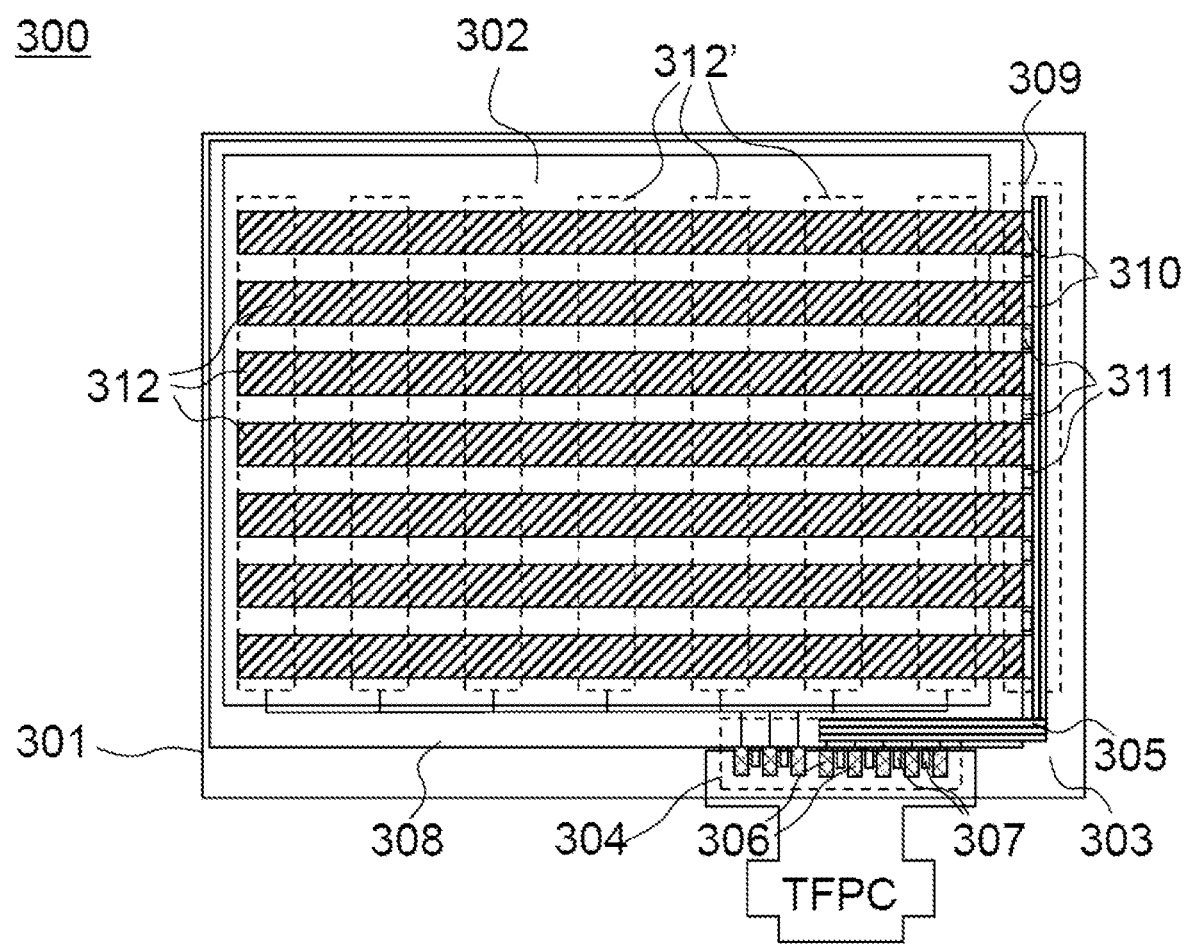
FIG. 3 shows a schematic view of a touch module according to an embodiment of the present disclosure.
Figure 4:
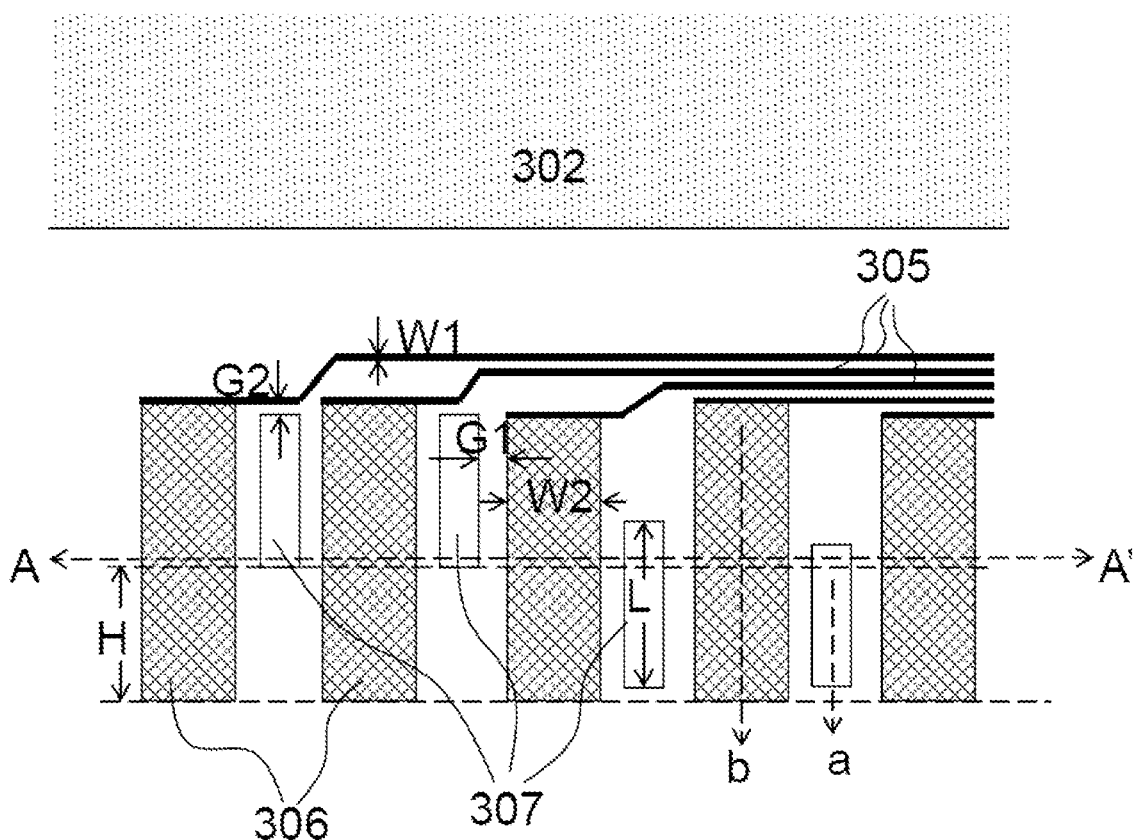
FIG. 4 is a partial view of a pad of the touch module according to the embodiment shown in FIG. 3.

According to an aspect of the present disclosure, there is provided a touch module. As shown in FIG. 3 and FIG. 4, a touch module 300 comprises: a substrate 301 comprising a touch region 302 and a non-touch region 303 around the touch region 302; the non-touch region 303 comprising a wiring region, a non-bonding region and a bonding region; a touch structure located in the touch region; at least one pad 306 located in the non-touch region 303; the at least one pad 306 comprising a pad bonding portion in the bonding region and a pad non-bonding portion in the non-bonding region; at least one wiring 305 located in the wiring region and electrically connected to the touch structure; and at least one first dummy pattern 307; wherein the at least one wiring 305 is electrically connected to the at least one pad 306, and the at least one first dummy pattern 307 is located in the non-bonding region and adjacent to the at least one pad 306.

In the embodiment of the present disclosure, the first dummy pattern 307 that is disposed in the non-bonding region and adjacent to the pad 306 can be used to effectively prevent water and oxygen from penetrating through the non-bonding region and corroding the wirings. When the touch module provided by the embodiment of the present disclosure undergoes a highly accelerated temperature and humidity stress test, water and oxygen will be blocked by the first dummy pattern 307 after entering the non-bonding region. The first dummy pattern 307 is located in the non-bonding region and adjacent to the pad 306 and has a certain width, thus narrowing the channel for water and oxygen intrusion. The above arrangement not only narrows the channel for water and oxygen intrusion, but also ensures the insulation between the pads 306 and the insulation between the wirings 305. Therefore, the touch module provided by the embodiment of the present disclosure prevents water and oxygen from invading the wirings during the highly accelerated temperature and humidity stress test, and solves the problem of corrosion and disconnection of the wirings 305 caused by the highly accelerated temperature and humidity stress test.

In the embodiment of the present disclosure, an end of the wiring 305 may be used as the pad 306, that is, the wiring 305 and the pad 306 connected to the wiring 305 may be integrated and may be made of the same material. Alternatively, an end of the wiring 305 may be electrically connected to a corresponding pad 306, that is, the wiring 305 and the pad 306 connected to the wiring 305 may not be integrated and may be made of different materials. In the context of the present disclosure, the "bonding portion" refers to an overlapping portion after the pad 306 is bonded (i.e., electrically connected) with, for example, a touch flexible printed circuit board (TFPC). In the context of the present disclosure, the "non-bonding portion" refers to a portion of the pad 306 that is not bonded (i.e., electrically connected). Optionally, in some embodiments, as shown in FIG. 3 and FIG. 4, the at least one wiring 305 is distributed on a side of the at least one first dummy pattern 307 close to the touch region 302.

With the above arrangement, the at least one wiring 305 is closer to the touch region 302 of the touch module than the at least one pad 306 and the at least one first dummy pattern 307. As a result, water and oxygen from the outside of the touch module can only approach the wiring 305 via a narrow gap between the pad 306 and the first dummy pattern 307.

Optionally, in some embodiments, as shown in FIG. 4, the at least one first dummy pattern 307 is located at an end of the non-bonding region close to the touch region 302.

Arranging the at least one first dummy pattern 307 at an end of the non-bonding region close to the touch region 302 can form a plurality of narrow paths in the vicinity of the wiring 305, block water and oxygen intrusion, and protect the wiring 305 on the periphery of the touch region 302.

Optionally, in some embodiments, a length extension direction (as shown by arrow "a" in FIG. 4) of the at least one first dummy pattern 307 is substantially parallel to a length extension direction (as shown by arrow "b" in FIG. 4) of the at least one pad 306.

In the context of the present disclosure, the "length extension direction" refers to the length direction of an element, relative to the width direction. Typically, the dimension of an element in the length direction is larger than the dimension of the element in the width direction. "Substantially parallel" means that the length extension directions of two elements are not limited to be completely parallel, and an included angle therebetween may also be a value within the range of process or measurement errors, for example, the included angle is between 175° and 185°. The at least one first dummy pattern 307 and the at least one pad 306 have substantially the same extension direction, so that water and oxygen need to pass through a long and narrow path to approach the wirings, thus better protecting the wirings.

Optionally, in some embodiments, as shown in FIG. 4, a minimum distance G1 between the first dummy pattern 307 and the directly adjacent pad 306 is greater than or equal to twice a maximum width W1 of the wiring 305.

In the embodiment of the present disclosure, the wirings 305 have substantially uniform widths. However, the present invention is also applicable to designs with varying wiring widths. Correspondingly, the minimum distance G1 between the first dummy pattern 307 and the directly adjacent pad 306 should be greater than or equal to twice the minimum width W1 of the wiring 305. With the above arrangement, a short circuit between the first dummy pattern 307 and the directly adjacent pad 306 is avoided. In addition, an excessively small gap will lead to higher process precision, so the above arrangement can also simplify the manufacturing process.

Optionally, in some embodiments, as shown in FIG. 4, a minimum distance G2 between the first dummy pattern 307 and the directly adjacent wiring 305 is greater than or equal to twice the maximum width W1 of the wiring 305.

Likewise, for designs with different wiring widths, the minimum distance G2 between the first dummy pattern 307 and the directly adjacent wiring 305 should be greater than or equal to twice the minimum width W1 of the wiring 305.

With the above arrangement, a short circuit between the first dummy pattern 307 and the directly adjacent wiring 305 is avoided. In addition, an excessively small gap will lead to higher process precision, so the above arrangement can also simplify the manufacturing process.

Optionally, in some embodiments, as shown in FIG. 4, a minimum length L of the first dummy pattern 307 is greater than or equal to a maximum width W2 of the pad 306.

The minimum length of the first dummy pattern 307 is greater than or equal to the maximum width of the pad 306, so that water and oxygen need to pass through a long and narrow path to approach the wiring 305. In addition, such a configuration also improves the flatness of the surface of the touch module 300. As a result, after the touch module 300 is bonded to an external circuit such as a touch flexible printed circuit board (TFPC), a more ideal isolation effect can be achieved.

Optionally, in some embodiments, the maximum length L of the first dummy pattern 307 is greater than or equal to the maximum width W2 of the pad 306.

Optionally, in some embodiments, as shown in FIG. 3, the touch module 300 further comprises: an insulating layer 308 covering the at least one wiring 305; wherein the insulating layer 308 is located on a side of the at least one wiring 305 facing away from the substrate 301.

By arranging the insulating layer 308 covering the at least one wiring 305, a sealing structure is formed on a surface of the at least one wiring 305 facing away from the substrate 301.

Optionally, in some embodiments, the material of the at least one first dummy pattern 307 is at least one of a conductive metal, a metal oxide, and a metal alloy material. The metal material includes, but is not limited to, copper (Cu), silver (Ag), gold (Au), aluminum (Al), titanium (Ti), or the like. The first dummy pattern 307 made of the metal material can react with the invading water and oxygen, consume water and oxygen, and produce an effect of "absorbing" water and oxygen, thereby more effectively preventing the wirings from being corroded by water and oxygen.

Optionally, in some embodiments, the at least one wiring 305, the at least one pad 306, and the at least one first dummy pattern 307 comprise the same material. Further, the at least one wiring 305, the at least one pad 306, and the at least one first dummy pattern 307 may be made of the same material. For example, in some embodiments of the present disclosure, a single patterning process is used to perform patterning of film layers of the same material, thereby forming the at least one wiring 305, the at least one pad 306, and the at least one first dummy pattern 307. The above patterning process can be performed on a single metal film layer, thereby simplifying the manufacturing process. In addition, the at least one wiring 305, the at least one pad 306, and the at least one first dummy pattern 307 fabricated by the above manner may be located in the same layer, which further eliminates the step difference and narrows the channel for water and oxygen intrusion.

Optionally, in some embodiments, as shown in FIG. 4, an end of the at least one first dummy pattern 307 close to the wiring 305 is substantially flush with an end of the at least one adjacent pad 306 close to the wiring 305.

Optionally, in some embodiments, the end of the at least one first dummy pattern 307 close to the wiring 305 is closer to the wiring 305 than the end of the at least one adjacent pad 306 close to the wiring 305.

With the above arrangement, the space between the pad 306 and the wiring 305 can be reduced, so as to avoid accumulation of water and oxygen after intrusion, and effectively prevent the wiring 305 from being corroded by water and oxygen.

Optionally, in some embodiments, the at least one first dummy pattern 307 comprises a plurality of first dummy patterns, and ends of the plurality of first dummy patterns 307 that are close to the wiring 305 gradually approach the bonding region along the horizontal direction. The slope k of the arrangement is not 0, for example, in the ranges of −1 to 0 and 0 to −1.

Optionally, in some embodiments, as shown in FIG. 4, the maximum distance and the minimum distance H between an end of the at least one first dummy pattern 307 away from the wiring 305 and the bonding region range from about 0.05 mm to 0.15 mm.

In the embodiment of the present disclosure, "about 0.05 mm to 0.15 mm" means that the numerical range of the minimum distance and the maximum distance is not limited to being between 0.05 mm and 0.15 mm, which may be a value within the range of process or measurement errors, for example, fluctuating by 10% above and below 0.05 mm and 0.15 mm. With the above arrangement, a short circuit between the first dummy pattern 307 and the bonding region is avoided.

Optionally, in some embodiments, the non-touch region comprises at least one pad group consisting of the pads 306.

Optionally, in some embodiments, the at least one pad group comprises at least one sensing electrode (RX) pad group and at least one transmitting electrode (TX) pad group.

Optionally, in some embodiments, a minimum length of the at least one first dummy pattern 307 in the at least one sensing electrode (RX) pad group is greater than or equal to a minimum length of the at least one first dummy pattern 307 in the at least one transmitting electrode (TX) pad group.

The minimum length of the first dummy pattern 307 in the sensing electrode (RX) pad group is greater than or equal to the minimum length of the first dummy pattern 307 in the transmitting electrode (TX) pad group, which can form a longer narrow path in the vicinity of the wiring 305 electrically connected to the sensing electrode (RX) pad group so as to block water and oxygen intrusion. The wirings 305 electrically connected to the sensing electrode (RX) pad group are more susceptible to water and oxygen corrosion than the wirings 305 electrically connected to the transmitting electrode (TX) pad group. With the above arrangement, the wirings 305 electrically connected to the sensing electrode (RX) pad group can be better protected.

Figure 10:
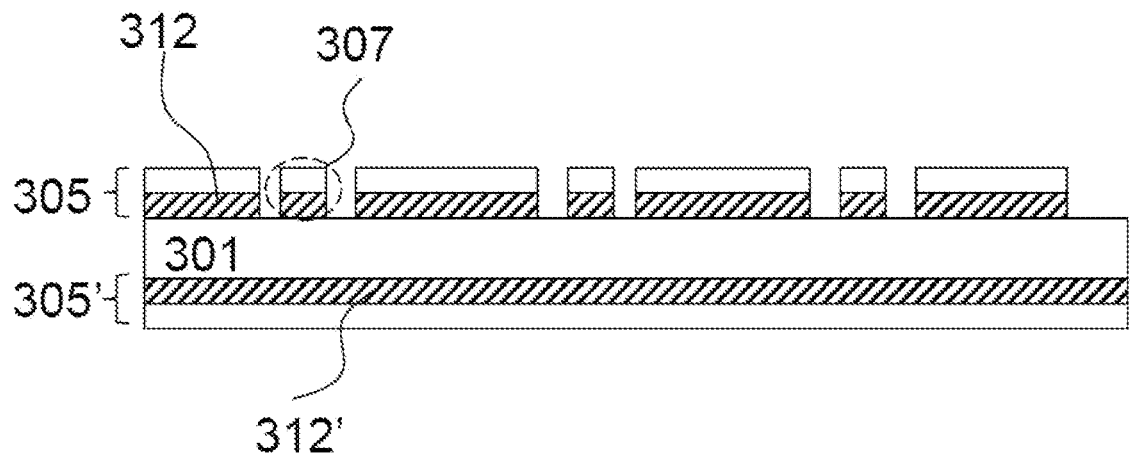
FIG. 10 shows a schematic cross-sectional view taken along the line A-A' shown in FIG. 4.

Optionally, in some embodiments, as shown in FIG. 10, the at least one first dummy pattern 307 and/or the at least one wiring 305 (305') have a double-layer structure.

Optionally, in some embodiments, the double-layer structure comprises an ITO layer and a metal layer having an area at least partially overlapping the ITO layer. For example, the wiring 305 in FIG. 10 includes a portion of a first touch signal line 312 and a metal layer.

Figure 5:
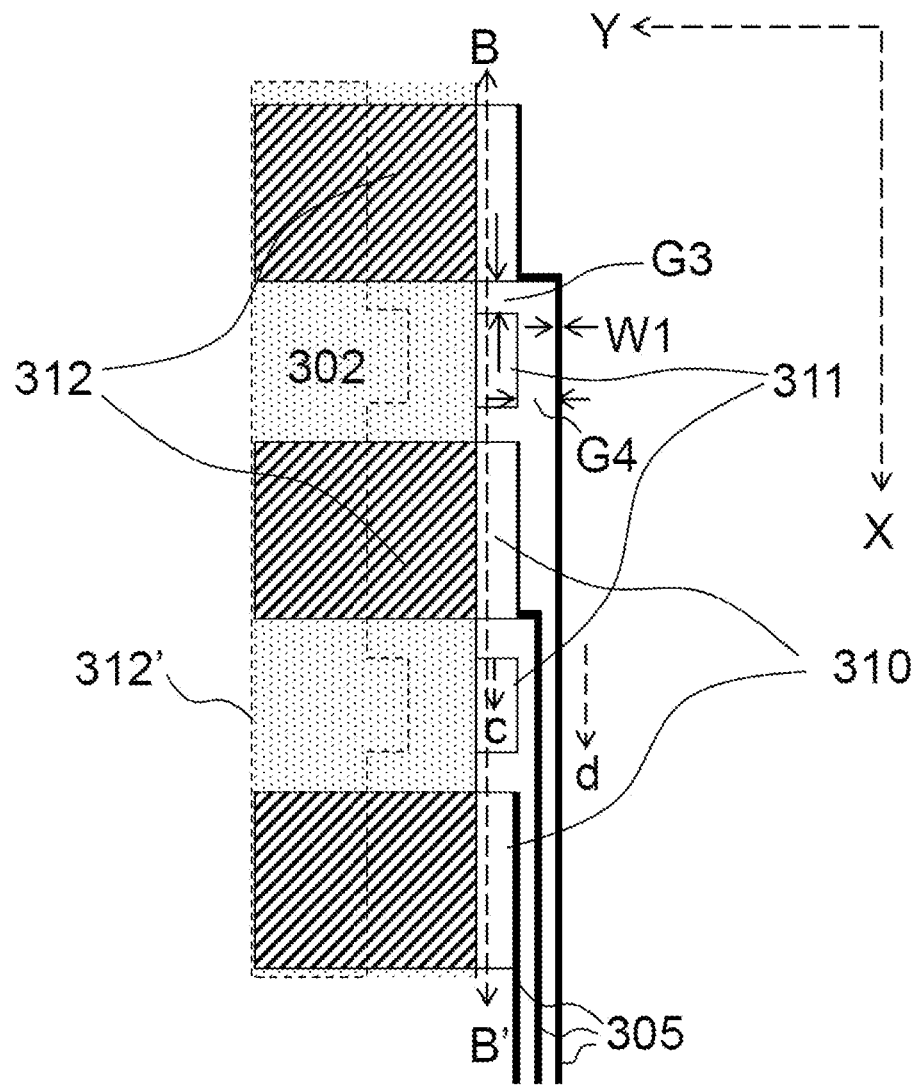
FIG. 5 is a partial view of a side region of the touch module according to the embodiment shown in FIG. 3.

According to another aspect of the present disclosure, there is provided a touch module. As shown in FIG. 3 and FIG. 5, a touch module 300 comprises: a substrate 301 comprising a touch region 302 and a non-touch region 303 around the touch region 302, the non-touch region 303 comprising a side region 309; a touch structure located in the touch region; at least one wiring 305; at least one lap block 310; and at least one second dummy pattern 311; wherein a portion of the at least one wiring 305, the at least one lap block 310, and the at least one second dummy pattern 311 are located in the side region 309; the at least one wiring 305 is electrically connected to the at least one lap block 310, the at least one lap block 310 is electrically connected to the touch structure, and the at least one second dummy pattern 311 is adjacent to the at least one lap block 310.

In the embodiment of the present disclosure, by arranging the second dummy pattern 311 adjacent to the lap block 310, water and oxygen can be effectively prevented from penetrating through a gap region between the lap block 310 and the second dummy pattern 311 and corroding the wirings. When the touch module provided by the embodiment of the present disclosure undergoes a highly accelerated temperature and humidity stress test, water and oxygen will be blocked by the second dummy pattern 311 after entering the gap region. The second dummy pattern 311 is adjacent to the lap block 310 and has a certain width, thus narrowing the channel for water and oxygen intrusion. The above arrangement not only narrows the channel for water and oxygen intrusion, but also ensures the insulation between the lap blocks 310 and the insulation between the wirings 305. As a result, the touch module provided by the embodiment of the present disclosure prevents water and oxygen from invading the wirings during the highly accelerated temperature and humidity stress test, and solves the problem of corrosion and disconnection of the wirings 305 caused by the highly accelerated temperature and humidity stress test.

Optionally, in some embodiments, as shown in FIG. 5, the at least one lap block 310 comprises a plurality of lap blocks 310 that are arranged along a first direction X, and the at least one second dummy pattern 311 is located in a gap between adjacent lap blocks 310.

In the embodiment of the present disclosure, the second dummy pattern 311 disposed in the gap region between two adjacent lap blocks 310 can be used to effectively prevent water and oxygen from penetrating through the gap region and corroding the wirings.

Optionally, in some embodiments, as shown in FIG. 5, the at least one wiring 305 comprises a plurality of wirings 305, and the plurality of wirings 305 are distributed on a side of the at least one second dummy pattern 311 away from the touch region 302. With the above arrangement, the plurality of wirings 305 are farther from the touch region 302 of the touch module than the plurality of lap blocks 310 and the at least one second dummy pattern 311. Therefore, water and oxygen from the outside of the touch module can only approach the wirings 305 via the narrow gap between the lap block 310 and the second dummy pattern 311.

Optionally, in some embodiments, as shown in FIG. 5, the at least one second dummy pattern 311 and the plurality of lap blocks 310 are arranged in the first direction X, the at least one second dummy pattern 311 and the plurality of lap blocks 310 have substantially the same width in a second direction Y, and the first direction X intersects the second direction Y. With such an arrangement, the channel for water and oxygen intrusion is narrowed, making it difficult for water and oxygen to approach the wiring 305 through the gap between adjacent lap blocks 310. In addition, with this arrangement, multiple channels for water and oxygen intrusion are arranged in the first direction X, which also facilitates subsequent formation of a further sealing structure.

Optionally, in some embodiments, as shown in FIG. 5, the first direction X and the second direction Y are substantially perpendicular to each other.

In the context of the present disclosure, "substantially perpendicular to each other" means that the two directions are not limited to being completely perpendicular, and an included angle therebetween may also be a value within the range of process or measurement errors, for example, the included angle is between 85° and 95°.

Optionally, in some embodiments, as shown in FIG. 3 and FIG. 5, the touch structure comprises a plurality of touch signal lines. The plurality of touch signal lines include a plurality of first touch signal lines 312 arranged along the first direction X and a plurality of second touch signal lines 312' arranged along the second direction Y, the plurality of first touch signal lines 312 and the plurality of lap blocks 310 are in one-to-one correspondence, and an end of the lap block 310 close to the touch region 302 is connected to a corresponding first touch signal line 312.

Optionally, in some embodiments, the first touch signal line 312 comprises a sensing electrode.

Optionally, in some embodiments, the second touch signal line 312' comprises a transmitting electrode.

Optionally, in some embodiments, as shown in FIG. 5, a minimum distance G3 between the second dummy pattern 311 and the directly adjacent lap block 310 is greater than or equal to twice the maximum width W1 of the wiring 305.

In the embodiment of the present disclosure, the wirings 305 have substantially uniform widths. However, the present invention is also applicable to designs with varying wiring widths. Correspondingly, the minimum distance G3 between the second dummy pattern 311 and the directly adjacent lap block 310 should be greater than or equal to twice the minimum width W1 of the wiring 305. With the above arrangement, a short circuit between the second dummy pattern 311 and the directly adjacent lap block 310 is avoided. In addition, an excessively small gap will lead to higher process precision, so the above arrangement can also simplify the manufacturing process.

Optionally, in some embodiments, the extension direction (as shown by arrow "c" in FIG. 5) of the at least one second dummy pattern 311 is substantially parallel to the extension direction (as shown by arrow "d" in FIG. 5) of the plurality of wirings 305 in the side region 309. A minimum distance G4 between the second dummy pattern 311 and the plurality of wirings 305 is greater than or equal to twice the maximum width W1 of the wiring 305.

Likewise, for designs with different wiring widths, the minimum distance G4 between the second dummy pattern 311 and the directly adjacent wiring 305 should be greater than or equal to twice the minimum width W1 of the wiring 305. With the above arrangement, a short circuit between the second dummy pattern 311 and the directly adjacent wiring 305 is avoided. In addition, an excessively small gap will lead to higher process precision, so the above arrangement can also simplify the manufacturing process.

Optionally, in some embodiments, the material of the at least one second dummy pattern 311 is at least one of a conductive metal, a metal oxide, and a metal alloy material. The metal material includes, but is not limited to, copper (Cu), silver (Ag), gold (Au), aluminum (Al), titanium (Ti), or the like. The second dummy pattern 311 made of a metal material can react with the invading water and oxygen, consume water and oxygen, and produce an effect of "absorbing" water and oxygen, thereby more effectively preventing the wirings from being corroded by water and oxygen.

Optionally, in some embodiments, the at least one wiring 305, the at least one lap block 310, and the at least one second dummy pattern 311 comprise the same material. Further, the at least one wiring 305, the at least one lap block 310, and the at least one second dummy pattern 311 may be made of the same material. For example, in some embodiments of the present disclosure, a single patterning process is used to perform patterning of film layers of the same material, thereby forming the at least one wiring 305, the at least one lap block 310, and the at least one second dummy pattern 311. The above patterning process may be performed on a single metal film layer, thereby simplifying the manufacturing process. In addition, the plurality of wirings 305, the plurality of lap blocks 310, and the plurality of second dummy patterns 311 fabricated by the above manner may be located in the same layer, which further eliminates the step difference and narrows the channel for water and oxygen intrusion.

Figure 11:
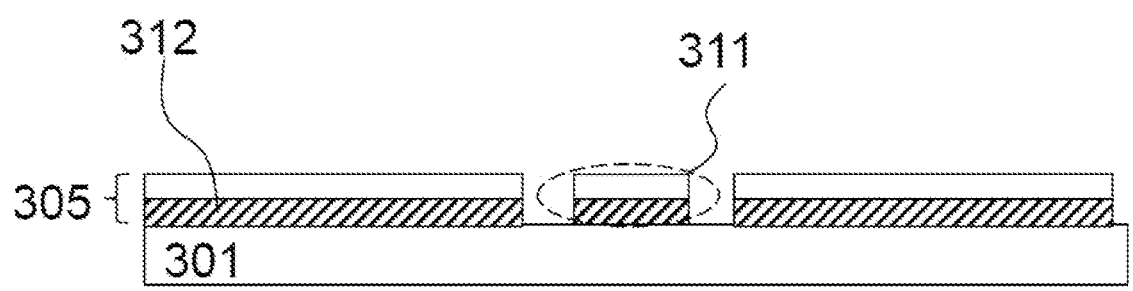
FIG. 11 shows a schematic cross-sectional view taken along the line B-B' shown in FIG. 5.

Optionally, in some embodiments, as shown in FIG. 11, the at least one second dummy pattern 311 and/or the at least one wiring 305 have a double-layer structure.

Optionally, in some embodiments, the double-layer structure comprises an ITO layer and a metal layer having an area at least partially overlapping the ITO layer. For example, the wiring 305 in FIG. 11 comprises a portion of the first touch signal line 312 and a metal layer.

Optionally, in some embodiments, the first touch signal line 312 and the lap block 310 at least have partially overlapping areas.

Optionally, in some embodiments, the first touch signal line 312 and the lap block 310 are made of different materials and located in different film layers.

According to a further aspect of the present disclosure, there is provided a touch display device. FIG. 6 shows a schematic cross-sectional view of a touch display device according to an embodiment of the present disclosure. As shown in FIG. 6, a touch display device 600 comprises: a display panel 601, and the touch module 300 according to any of the foregoing embodiments arranged on the display panel 601. The touch module 300 comprises a substrate 301; a plurality of first touch signal lines 312, at least one wiring 305, at least one pad 306, and at least one first dummy pattern (not shown) on a first surface of the substrate 301. The touch module 300 is electrically connected to an external circuit 604 (e.g., TFPC) via a bonding portion of the at least one pad 306. The touch module 300 may further comprise an insulating layer 308 covering the at least one wiring 305; wherein the insulating layer 308 is located on a side of the at least one wiring 305 facing away from the substrate 301. In addition, similar to the arrangement on the first surface of the substrate 301, the touch module 300 may further comprise a plurality of second touch signal lines 312' and at least one wiring 305' on a second surface of the substrate 301. The touch module 300 may further comprise an insulating layer 308' covering the at least one wiring 305'; wherein the insulating layer 308' is located on a side of the at least one wiring 305' facing away from the substrate 301.

Optionally, in some embodiments, the first touch signal line 312 comprises a sensing electrode.

Optionally, in some embodiments, the second touch signal line 312' comprises a transmitting electrode.

Optionally, in some embodiments, the material of the wiring 305 of the touch module 300 includes copper; the atomic percentage of copper of the wiring 305 is greater than or equal to 40%.

According to yet another aspect of the present disclosure, there is provided a manufacturing method of a touch module. As shown in FIG. 7, the method comprises: S701, providing a substrate, the substrate comprising a touch region and a non-touch region around the touch region, the non-touch region comprising a wiring region, a non-bonding region and a bonding region; a touch structure located in the touch region; at least one pad located in the non-touch region, the at least one pad comprising a pad bonding portion in the bonding region and a pad non-bonding portion in the non-bonding region; S702, arranging at least one wiring in the wiring region, one end of the at least one wiring being electrically connected to the touch structure, and the other end of the at least one wiring being electrically connected to the pad; and S703, arranging at least one first dummy pattern in the non-bonding region, the first dummy pattern being adjacent to the at least one pad.

In the embodiment of the present disclosure, the first dummy pattern 307 that is disposed in the non-bonding region and adjacent to the pad 306 can be used to effectively prevent water and oxygen from penetrating through the non-bonding region and corroding the wirings. When the touch module provided by the embodiment of the present disclosure undergoes a highly accelerated temperature and humidity stress test, water and oxygen will be blocked by the first dummy pattern 307 after entering the non-bonding region. The first dummy pattern 307 is located in the non-bonding region and adjacent to the pad 306 and has a certain width, thus narrowing the channel for water and oxygen intrusion. The above arrangement not only narrows the channel for water and oxygen intrusion, but also ensures the insulation between the pads 306 and the insulation between the wirings 305. Therefore, the touch module provided by the embodiment of the present disclosure prevents water and oxygen from invading the wirings during the highly accelerated temperature and humidity stress test, and solves the problem of corrosion and disconnection of the wirings 305 caused by the highly accelerated temperature and humidity stress test.

Figures 8, 9:
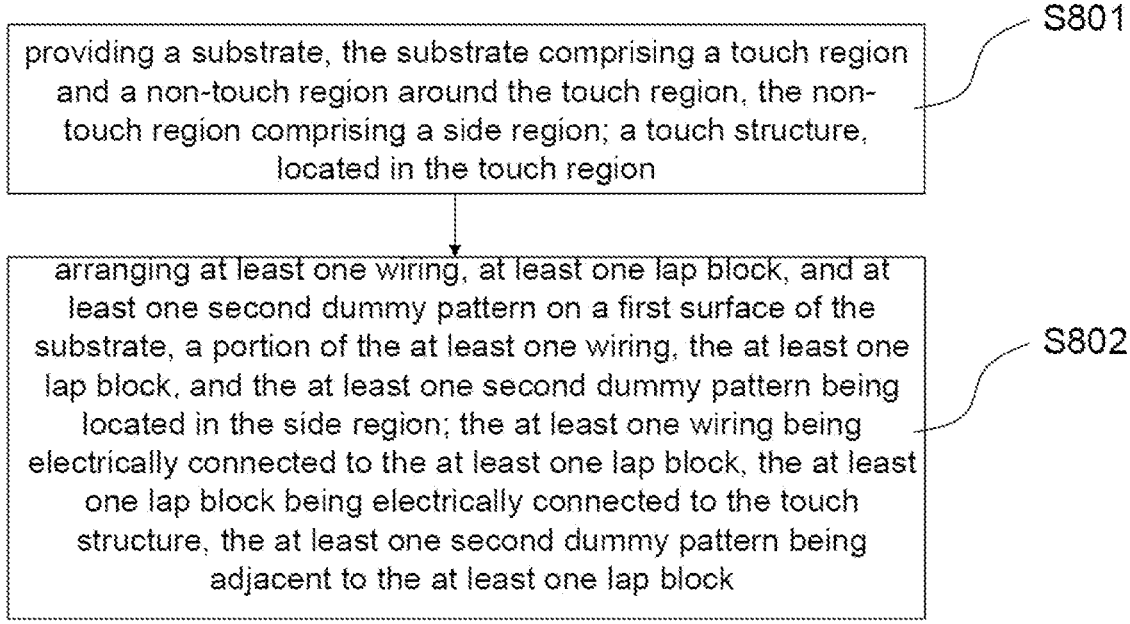
FIG. 8 shows a flowchart of a manufacturing method of a touch module according to another embodiment of the present disclosure.
FIG. 9 shows a comparison of wiring components that have undergone HAST as measured by an energy dispersive spectrometer.

According to yet another aspect of the present disclosure, there is provided a manufacturing method of a touch module. As shown in FIG. 8, the method comprises: S801, providing a substrate, the substrate comprising a touch region and a non-touch region around the touch region, the non-touch region comprising a side region; a touch structure, located in the touch region; and S802, arranging at least one wiring, at least one lap block, and at least one second dummy pattern on a first surface of the substrate, a portion of the at least one wiring, the at least one lap block, and the at least one second dummy pattern being located in the side region; the at least one wiring 305 being electrically connected to the at least one lap block 310, the at least one lap block 310 being electrically connected to the touch structure, the at least one second dummy pattern 311 being adjacent to the at least one lap block 310. In the embodiment of the present disclosure, by arranging the second dummy pattern 311 adjacent to the lap block 310, water and oxygen can be effectively prevented from penetrating through a gap region between the lap block 310 and the second dummy pattern 311 and corroding the wirings. When the touch module provided by the embodiment of the present disclosure undergoes a highly accelerated temperature and humidity stress test, water and oxygen will be blocked by the second dummy pattern 311 after entering the gap region. The second dummy pattern 311 is adjacent to the lap block 310 and has a certain width, thus narrowing the channel for water and oxygen intrusion. The above arrangement not only narrows the channel for water and oxygen intrusion, but also ensures the insulation between the lap blocks 310 and the insulation between the wirings 305. As a result, the touch module provided by the embodiment of the present disclosure prevents water and oxygen from invading the wirings during the highly accelerated temperature and humidity stress test, and solves the problem of corrosion and disconnection of the wirings 305 caused by the highly accelerated temperature and humidity stress test.

In the embodiment of the present disclosure, the materials of the wiring, the first dummy pattern, the second dummy pattern, the touch signal line, the pad, and the lap block may be at least one of a conductive metal, a metal oxide, and a metal alloy material, including but not limited to, for example, copper (Cu), silver (Ag), gold (Au), aluminum (Al), titanium (Ti), indium tin oxide (ITO), or the like.

When the wirings are made of copper, the reaction equations of electrochemical corrosion are: $Cu-2e \rightarrow Cu^{2+}$, and $O_2+4e^-+2H_2O \rightarrow 4OH^-$. FIG. 9 shows a comparison of wiring components that have undergone HAST as measured by an energy dispersive spectrometer (EDS). After undergoing the HAST, in the touch module of the embodiment of the present disclosure, the atomic percentage (At %) of copper of the wirings is reduced from 57.84% to 43.34%. Compared with the wirings in the touch module of the embodiment of the present disclosure, after the wirings of a control sample have undergone the HAST, the atomic percentage of copper is reduced from 57.84% to 24.25%, and the atomic percentages of carbon and oxygen elements are increased to 51.02% and 21.68% respectively. It can be seen that more copper oxides are formed in the wirings of the control sample. In addition, the results of a focused ion beam (FIB) test also show that, compared with the wirings in the touch module of the embodiment of the present disclosure, in the wirings of the control sample, the morphology of the copper layer in the corrosion region is changed, there are dense holes in the metal lines, and the copper wirings are severely corroded.

In the description of the present disclosure, the orientations or positional relationships indicated by the terms such as "upper" and "lower" are based on orientations or positional relationships shown in the drawings, which are only for facilitating description of the present disclosure, rather than requiring that the present disclosure must be constructed and operated in a particular orientation, thus they cannot be construed as limitations to the present disclosure.

In the description of this specification, the description with reference to the terms "an embodiment", "another embodiment", etc. means that a specific feature, structure, material or characteristic described in conjunction with said embodiment is included in at least one embodiment of the present disclosure. In this specification, the schematic representations of the above-mentioned terms do not necessarily refer to the same embodiment or example. Moreover, the described specific feature, structure, material or characteristic may be combined in any one or more embodiments or examples in a suitable manner. In addition, those skilled in the art can combine different embodiments or examples and the features of the different embodiments or examples described in this specification in the case of causing no conflict. In addition, it is to be noted that in this specification, the terms "first" and "second" are only used for descriptive purposes, and cannot be understood as indicating or implying relative importance or implicitly indicating the number of indicated technical features.

What have been stated above are only specific embodiments of the present disclosure, but the protection scope of the present disclosure is not limited thereto. Any variations or substitutions that can be easily conceived by those skilled in the art familiar with this technical field within the technical scope revealed by the present disclosure should be encompassed within the protection scope of the present disclosure. Thus, the protection scope of the present disclosure should be based on the protection scope of the claims.

What is claimed is:

1. A touch module, comprising:
   a substrate, comprising a touch region and a non-touch region around the touch region; the non-touch region comprising a wiring region, a non-bonding region and a bonding region;
   a touch structure, located in the touch region;
   at least one pad, located in the non-touch region, the at least one pad comprising a pad bonding portion in the bonding region and a pad non-bonding portion in the non-bonding region;
   at least one wiring, located in the wiring region and electrically connected to the touch structure; and
   at least one first dummy pattern;
   wherein the at least one wiring is further electrically connected to the at least one pad, the at least one first dummy pattern is located in the non-bonding region and adjacent to the at least one pad, and each pad connected to one of the at least one wiring is provided with one of the at least one first dummy pattern immediately adjacent to it.

2. The touch module according to claim 1, wherein the at least one wiring is distributed on a side of the at least one first dummy pattern close to the touch region.

3. The touch module according to claim 1, wherein the at least one first dummy pattern is located at an end of the non-bonding region close to the touch region.

4. The touch module according to claim 1, wherein a length extension direction of the at least one first dummy pattern is substantially parallel to a length extension direction of the at least one pad.

5. The touch module according to claim 1, wherein a minimum distance between the at least one first dummy pattern and a directly adjacent pad is greater than or equal to twice a maximum width of a wiring.

6. The touch module according to claim 1, wherein a minimum distance between the at least one first dummy pattern and a directly adjacent wiring is greater than or equal to twice a maximum width of a wiring.

7. The touch module according to claim 1, wherein a minimum length of the at least one first dummy pattern is greater than or equal to a maximum width of a directly adjacent pad.

8. The touch module according to claim 1, wherein a material of the at least one first dummy pattern is at least one of a conductive metal, a metal oxide, and a metal alloy material; wherein the at least one wiring, the at least one pad, and the at least one first dummy pattern comprise the same material.

9. The touch module according to claim 1, wherein an end of the at least one first dummy pattern close to the wiring is substantially flush with an end of at least one adjacent pad close to the wiring.

10. The touch module according to claim 1, wherein a maximum distance and a minimum distance between an end of the at least one first dummy pattern away from the wiring and the bonding region range from about 0.05 mm to 0.15 mm.

11. A touch module, comprising:
    a substrate, comprising a touch region and a non-touch region around the touch region, the non-touch region comprising a side region;
    a touch structure, located in the touch region;
    at least one wiring;
    at least one lap block; and
    at least one second dummy pattern; wherein
    a portion of the at least one wiring, the at least one lap block, and the at least one second dummy pattern are located in the side region; the at least one wiring is electrically connected to the at least one lap block, the at least one lap block is electrically connected to the touch structure, the at least one second dummy pattern is adjacent to the at least one lap block, and each lap block electrically connected to the touch structure and one of the at least one wiring is provided with one of the at least one second dummy pattern immediately adjacent to it.

12. The touch module according to claim 11, wherein the at least one lap block comprises a plurality of lap blocks that are arranged along a first direction, and the at least one second dummy pattern is located in a gap between adjacent lap blocks.

13. The touch module according to claim 11, wherein the at least one wiring comprises a plurality of wiring, and the plurality of wirings are distributed on a side of the at least one second dummy pattern away from the touch region.

14. The touch module according to claim 11, wherein the at least one second dummy pattern and the plurality of lap blocks are arranged in the first direction, and the at least one second dummy pattern and the plurality of lap blocks have substantially the same width in a second direction, the first direction intersecting the second direction.

15. The touch module according to claim 11, wherein the touch structure comprises a plurality of touch signal lines; the plurality of touch signal lines comprise a plurality of first touch signal lines arranged along the first direction and a plurality of second touch signal lines arranged along the second direction, the plurality of first touch signal lines and the plurality of lap blocks are in one-to-one correspondence, and an end of the lap block close to the touch region is connected to a corresponding first touch signal line.

16. The touch module according to claim 15, wherein the first touch signal line comprises a sensing electrode.

17. The touch module according to claim 11, wherein a minimum distance between the at least one second dummy pattern and a directly adjacent lap block is greater than or equal to twice a maximum width of the wiring.

18. The touch module according to claim 11, wherein a length extension direction of the at least one second dummy pattern is substantially parallel to an extension direction of the plurality of wirings in the side region; a minimum distance between the at least one second dummy pattern and a directly adjacent wiring is greater than or equal to twice the maximum width of the wiring.

19. The touch module according to claim 11, wherein a material of the at least one second dummy pattern is at least one of a conductive metal, a metal oxide, and a metal alloy material; wherein the at least one wiring, the at least one lap block, and the at least one second dummy pattern comprise the same material.

20. A touch display device, comprising: a display panel, and the touch module according to claim 1 arranged on the display panel.

* * * * *